(12) United States Patent
Engebretsen et al.

(10) Patent No.: US 9,953,055 B1
(45) Date of Patent: Apr. 24, 2018

(54) SYSTEMS AND METHODS OF GENERATING SEMANTIC TRAFFIC REPORTS

(71) Applicant: Google Inc., Mountain View, CA (US)

(72) Inventors: Lars Kare Engebretsen, Zürich (CH); Ian James Leader, Zurich (CH)

(73) Assignee: Google LLC, Mountain View, CA (US)

( * ) Notice: Subject to any disclaimer, the term of this patent is extended or adjusted under 35 U.S.C. 154(b) by 400 days.

(21) Appl. No.: 14/577,836

(22) Filed: Dec. 19, 2014

(51) Int. Cl.
*G06F 7/00* (2006.01)
*G06F 17/30* (2006.01)

(52) U.S. Cl.
CPC .. *G06F 17/30448* (2013.01); *G06F 17/30477* (2013.01)

(58) Field of Classification Search
CPC ......... G06F 17/30554; G06F 17/30705; G06F 17/30601; G06F 17/30463; G06F 17/30598; G06F 17/3071; H04N 21/812
USPC ........................ 707/708, 722, 737
See application file for complete search history.

(56) References Cited

U.S. PATENT DOCUMENTS

| | | | |
|---|---|---|---|
| 7,428,533 B2 | 9/2008 | Kapur et al. | |
| 7,603,348 B2 | 10/2009 | He et al. | |
| 8,145,623 B1 * | 3/2012 | Mehta | G06F 17/3064 707/713 |
| 8,229,925 B2 | 7/2012 | Haugen et al. | |
| 8,260,664 B2 | 9/2012 | Vadlamani et al. | |
| 8,694,362 B2 | 4/2014 | Zimmerman et al. | |
| 2004/0059708 A1 * | 3/2004 | Dean | G06Q 30/02 |
| 2004/0204983 A1 * | 10/2004 | Shen | G06Q 10/10 705/14.43 |
| 2011/0060738 A1 * | 3/2011 | Gates | G06F 17/30749 707/737 |
| 2013/0311462 A1 * | 11/2013 | Khan | G06F 17/2785 707/728 |
| 2015/0039619 A1 * | 2/2015 | Zhang | G06F 17/30011 707/738 |

OTHER PUBLICATIONS

Andrew McCallum, Kamal Nigam, and Lyle H. Ungar. 2000. Efficient clustering of high-dimensional data sets with application to reference matching. In Proceedings of the sixth ACM SIGKDD international conference on Knowledge discovery and data mining (KDD '00). ACM, New York, NY, USA, 169-178.*

* cited by examiner

*Primary Examiner* — Cheyne D Ly
(74) *Attorney, Agent, or Firm* — Foley & Lardner LLP

(57) ABSTRACT

Systems and methods of this disclosure are directed to optimizing a content selector executing on content selection infrastructure. An entity engine retrieves a search query report with queries corresponding to selected content items of a content campaign and a performance metric for each query. The entity engine determines an entity for each of the queries. A cluster engine generates a first subset of the queries and a second subset of the queries based on the entity for each query. The cluster engine generates a first performance metric for the first subset and a second performance metric for the second subset. An interface displays the first performance metric and the second performance metric. A campaign generator receives a selection of a semantic criterion based on the first subset and updates the content campaign to include the semantic criterion.

20 Claims, 5 Drawing Sheets

SYSTEMS AND METHODS OF GENERATING SEMANTIC TRAFFIC REPORTS

BACKGROUND

In a networked environment such as the Internet, people or companies can provide information for public display on web pages or other documents. The web pages can include text, video, or audio information provided by the entities via a web page server for display on the internet. Additional content can also be provided by third parties for display on the web pages together with the information provided by the entities. Thus, a person viewing a web page can access the information that is the subject of the web page, as well as third party content that may appear with the web page.

SUMMARY

At least one aspect is directed to a method of optimizing a content selector executing on content selection infrastructure. The method includes an entity engine executing on one or more processors of a data processing system retrieving a search query report. The search query report includes a plurality of queries corresponding to selected content items of a content campaign. The search query report includes a performance metric for each of the plurality of queries. The method includes the entity engine determining, for each query of the plurality of queries by the entity engine, an entity or a set of entities. The method includes a cluster engine executing on the data processing system generating a first subset of the plurality of queries and a second subset of the plurality of queries. The cluster engine can generate the first subset and the second subset using a clustering technique applied to the entity for each query of the plurality of queries. The method includes the cluster engine generating, based on the performance metric for each of the plurality of queries, a first performance metric for the first subset and a second performance metric for the second subset. The first performance metric is different from the second performance metric. The method includes an interface providing for display the first performance metric and the second performance metric. The method includes the data processing system receiving, based on the first performance metric, a selection of a semantic criterion associated with the first subset. The method includes the data processing system updating the content campaign to include the semantic criterion.

Another aspect of the present disclosure relates to a system for optimization of a content selector executing on content selection infrastructure. The system includes an interface, an entity engine, a cluster engine, an interface, and a campaign generator executing on one or more processors of a data processing system. The entity engine retrieves a search query report. The search query report includes a plurality of queries corresponding to selected content items of a content campaign. The search query report includes a performance metric for each of the plurality of queries. The entity engine determines for each query of the plurality of queries an entity. The cluster engine generates a first subset of the plurality of queries and a second subset of the plurality of queries. The cluster engine generates the first subset and the second subset based on a clustering technique applied to the entity for each query of the plurality of queries. The cluster engine generates, based on the performance metric for each of the plurality of queries, a first performance metric for the first subset and a second performance metric for the second subset. The first performance metric is different from the second performance metric. The interface provides for display the first performance metric and the second performance metric. The data processing system receives, based on the first performance metric, a selection of a semantic criterion associated with the first subset. The data processing system updates the content campaign to include the semantic criterion.

Another aspect of the present disclosure is directed to a non-transitory computer readable medium storing instructions that, when executed by one or more processors, optimizes a content selector executing on content selection infrastructure. The instructions include instructions to retrieve a search query report. The search query report includes a plurality of queries corresponding to selected content items of a content campaign. The search query report includes a performance metric for each of the plurality of queries. The instructions include instructions to determine for each query of the plurality of queries an entity. The instructions include instructions to generate a first subset of the plurality of queries and a second subset of the plurality of queries. The instructions include instructions to generate the first subset and the second subset based on a clustering technique applied to the entity for each query of the plurality of queries. The instructions include instructions to generate, based on the performance metric for each of the plurality of queries, a first performance metric for the first subset and a second performance metric for the second subset. The first performance metric is different from the second performance metric. The instructions include instructions to provide for display the first performance metric and the second performance metric. The instructions include instructions to receive, based on the first performance metric, a selection of a semantic criterion associated with the first subset. The instructions include instructions to update the content campaign to include the semantic criterion.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
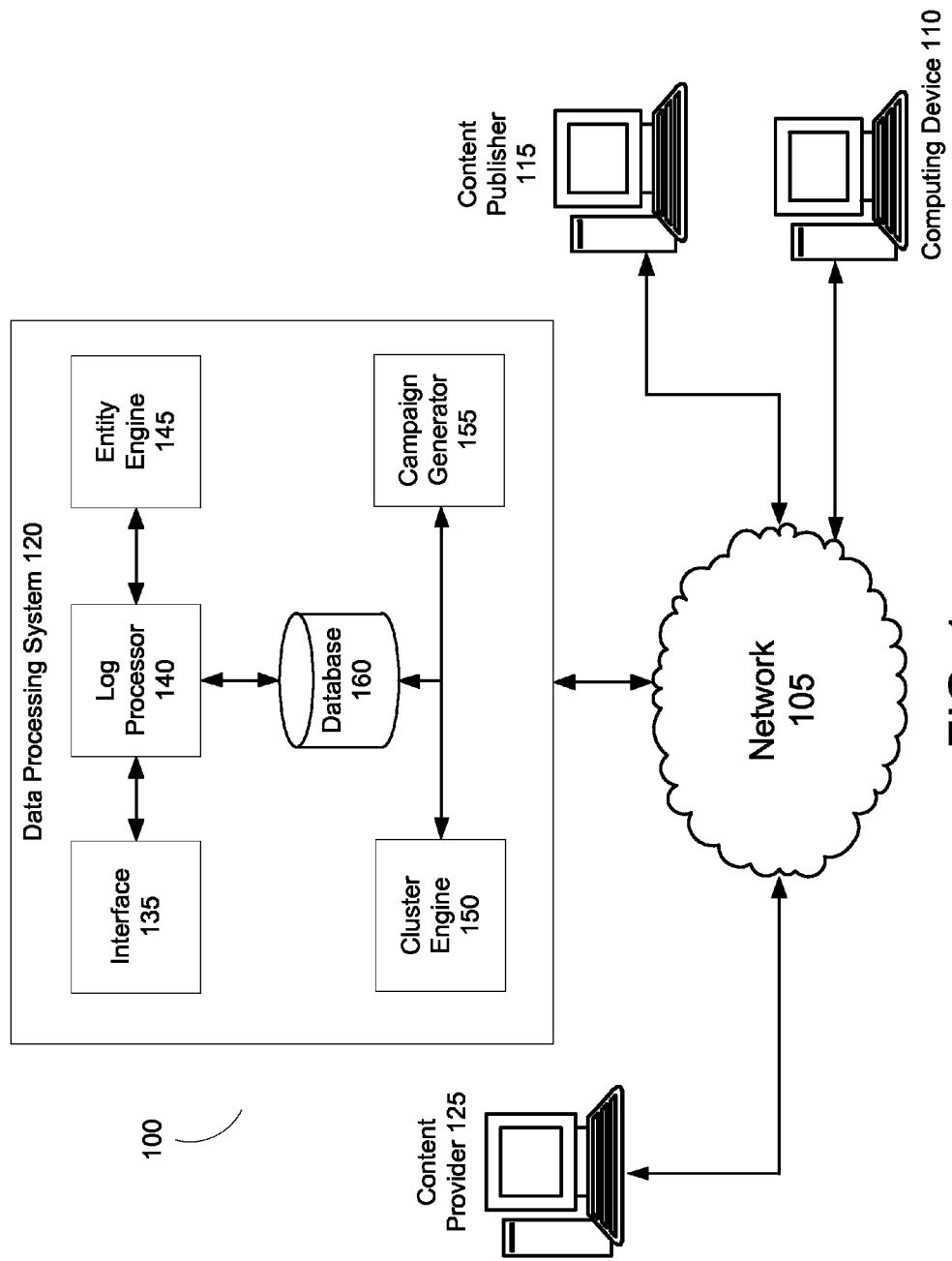
FIG. 1 is an illustration of a system for optimization of content selection infrastructure in accordance with an implementation.

The systems and methods described herein generally relate to improved search query reports that are organized based on semantic concepts. A data processing system may select content items (e.g., online documents, images, text, video, multimedia content, advertisements, or articles) for display alongside search results. The data processing system can select content items provided by a content provider, such as advertisements provided by an advertiser. The content item or advertisements may be selected based on a search query input into a search engine. To illustrate the performance of a content providers content campaign (e.g., an advertiser's advertisement campaign), the data processing system may generate a search query report that includes a performance metric for each search query that triggered an advertisement of the advertisement campaign. Search query reports may provide sparse performance data due to the large number of different search queries or restrictions on disclosing search queries, thus minimizing the usefulness of such reports.

Systems and methods described herein can generate improved search query reports that are organized based on semantic concepts. The search query reports can include a list of queries for which an advertisement was clicked or otherwise interacted with. The data processing system can identify queries that are semantically related to one another and cluster them together into blocks. The data processing system can also generate aggregated performance statistics for each block.

By analyzing the aggregated performance statistics for each block, the data processing system can determine semantic advertisement selection criteria to add to an advertisement campaign or advertisement group. For example, if the aggregated performance statistic for a first semantic cluster is high (e.g., high click through rate or conversion rate), then the data processing system (or advertiser) may add a semantic positive criteria corresponding to the semantic cluster. On the other hand, if the aggregated performance statistic for a second semantic cluster is low (e.g., low click through rate or conversion rate or return on investment), then the data processing system (or advertiser) may choose to add a semantic negative criteria corresponding to the second semantic cluster. The semantic negative criteria may prevent an advertisement in the advertisement campaign or advertisement group from being selected for display responsive to semantically related search queries.

In some implementations, the data processing system receives a search query report for an advertisement (e.g., advertisement campaign or advertisement group). The data processing system annotates the search queries in the search query report with entities (e.g., using an entity engine). Entities can include a person, place or thing, and can be categorized or structured using an ontological classification that includes one or more of classes, sets, collections, concepts, or entity-types.

After the data processing system annotates the search queries with entities using the entity engine, the data processing system can cluster the annotated search queries using a heuristic technique. For example, search queries annotated with similar entities can be grouped together. Similarity may include exact matches or overlapping terms. In some cases, the clustered groups may be mutually exclusive (e.g., a search query appears in only one semantic group), while in other cases the same search query may be associated with multiple semantic groups.

Thus, systems and methods described herein improve the understanding and performance of content campaigns or content groups through semantic mapping of traffic and can provide information that can be used to update or improve online content item placement campaigns, resulting in more efficient and improved content item placement on online documents via a computer network, for example.

FIG. 1 illustrates an example system 100 for optimization of a content selector executing on content selection infrastructure. The content selection infrastructure can include a data processing system 120 communicating via with one or more of a content provider 125, content publisher 115 or computing device 110 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be displayed on at least one computing device 110, such as a laptop, desktop, tablet, personal digital assistant, smart phone, or portable computers. For example, via the network 105 a user of the computing device 110 can access web pages provided by at least one web site operator or content publisher 115. In this example, a web browser of the computing device 110 can access a web server of the web site operator or content publisher 115 to retrieve a web page for display on a monitor of the computing device 110. The web site operator or content publisher 115 generally includes an entity that operates the web page. In one implementation, the web site operator or content publisher 115 includes at least one web page server that communicates with the network 105 to make the web page available to the computing device 110.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 120. The data processing system 120 can include at least one logic device such as a computing device having a processor to communicate via the network 105, for example with the computing device 110, the web site operator or content publisher computing device 115, and at least one content provider computing device 125. The data processing system 120 can include at least one server. For example, the data processing system 120 can include a plurality of servers located in at least one data center. The data processing system 120 can include multiple, logically-grouped servers and facilitate distributed computing techniques. The logical group of servers may be referred to as a server farm or a machine farm. The servers can also be geographically dispersed. A machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralizing the servers and storage systems and coupling them with advanced system management tools allows more efficient use of server resources.

The data processing system 120 can include a content placement system having at least one server. The data processing system 120 can also include at least one interface 135, at least one log processor 140, at least entity engine 145, at least one cluster engine 150, at least one campaign generator 155, and at least one database 160. The interface 135, log processor 140, entity engine 145, cluster engine 150, and campaign generator 155 can each include at least one processing unit or other logic device such as programmable logic array engine, or module configured to communicate with the database 160. The interface 135, log processor 140, entity engine 145, cluster engine 150, and campaign generator 155 can be separate components, a single component, or part of the data processing system 120. The system 100 and its components, such as a data processing system, may include hardware elements, such as one or more processors, logic devices, or circuits.

The data processing system 120 can obtain anonymous computer network activity information associated with a plurality of computing devices 110. A user of a computing device 110 can affirmatively authorize the data processing system 120 to obtain network activity information corresponding to the user's computing device 110. For example, the data processing system 120 can prompt the user of the computing device 110 for consent to obtain one or more types of network activity information, such as geographic location information. The identity of the user of the computing device 110 can remain anonymous and the computing device 110 may be associated with a unique identifier (e.g., a unique identifier for the user or the computing device provided by the data processing system or a user of the computing device). The data processing system can associate each observation with a corresponding unique identifier.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

The data processing system 120 can receive a request for content. The request may include a query such as a search query input into a search engine. The input query may include text, characters, symbols, etc. The data processing system 120 may receive the input query from a computing device 110 via network 105. The input query may include audio (e.g., words spoken by a user of the computing device 110 and input into the search engine of the data processing system via network 105 and interface 135).

Responsive to the search query or other request for content, the data processing system 120 can identify, select or otherwise obtain content to be provided or presented via the computing device 110 making the request, or some other computing device 110 associated with the request for content. The content may include, e.g., text, characters, symbols, images, video, audio, or multimedia content. The request for content can include a request for an online advertisement, article, promotion, coupon, or product description. The data processing system 120 can receive the request from a computing device such as, e.g., computing device 110. For example, the data processing system 120 can receive the request via an application executing on the computing device 110, such as a mobile application executing on a mobile device (e.g., smart phone or tablet) may make a request for content. In some instances, a web page may request content from the data processing system 120 responsive to a user of a mobile device 110 visiting the web page (e.g., via a mobile device 110).

The request for content can include information that facilitates content selection. For example, the data processing system 120 may request information from the computing device 110 to facilitate identifying content or content selection. The data processing system 120 may request or obtain information responsive to receiving a request for content from the computing device 110. The information may include information about displaying the content on the computing device 110 (e.g., a content slot size or position) or available resources of computing device 110 to display or otherwise manipulate the content.

The data processing system 120 can include an interface 135 designed and constructed to receive, access, obtain, transmit, convey or otherwise communicate with one or more component of the data processing system 120 or device (e.g., content provider 125, content publisher 115 and computing device 110) via network 105. In some implementations, the interface module 135 is configured to receive a search query provided via a user device 110. The search query can be input into a search engine of, associated with, or otherwise communicatively coupled to data processing system 120. The data processing system 120 can store the search query in a database 160 for later processing. In some implementations, the data processing system 120 provides or otherwise conveys the search query to the log processor 140, entity engine 145 or cluster engine 150 for further processing. The interface module 135 can receive content selection criteria information from a content provider 125 and stores this information in a database 160 or otherwise transmits or conveys the information to one or more component of the data processing system 120 for further processing. The interface 135 can be further designed and constructed to provide, generate, transmit, or otherwise present a graphical user interface via the computing device 110.

The data processing system 120 can include a log processor 140 that processes network activity information to generate data records storing, for each query, the number of impressions, the number of clicks, a click cost, an average position of the content item displayed on an online document or web page, and the number of conversions. In some implementations, the log processor 140 can obtain or process query logs or event logs to generate this information. The log processor 140 can process this information in an offline process based on a time interval, such as daily, twice a day, hourly, or weekly. The network activity information may include, e.g., browsing history, search history, search queries input by one or more computing devices 110 into a search engine, content item impressions or indications of interaction with the content items (e.g., online advertisements), or information associated with the content item that was selected for display.

The data processing system 120 can generate or store one or more database record that includes a search query report or information used to generate a search query report, such as the information generated or used by the log processor 140. The information can include or be generated based on, e.g., content impression records or query logs used to generate search query reports. The information can include, e.g., an identifier for a content item, an indication of interaction with the content item (e.g., a click, conversion, mouse-over, text input, audio input, or finger gesture), or a day and time stamp. The information may include an identifier for a content group of the content item or content campaign of the content item. A content group may refer to multiple content items that are associated with a set of content selection criteria (e.g., keywords or entities) and bids that are managed together by a content provider. Content items in a content group may have the same or similar landing page (e.g., the web page to which a computing device is directed to responsive to a click or other interaction with the content item). A content campaign may refer to a one or more content groups (e.g., content items, content selection criteria, and bids) that share a budget, location targeting or other settings. A content provider may use a content campaign to organize categories of products or servers to offer.

The log processor 140 can organize the processed data records using a tuple that includes, e.g., one or more of a content campaign identifier, a content group identifier, a query language, a query country, and a normalized query. In some cases, the log processor 140 can organize the data using a 4-tuple, a 3-tuple or a 2-tuple. The normalized query may refer to normalizing the text of a query by replacing literals in it with parameter markers, thereby flattening the parameter values for the query such that statistics from different instances of the query can be aggregated together and compared against one another.

The data processing system 120 can store the results of the log processor 140 in a data record such as a sorted string table ("SSTable") that facilitates the storing, processing and exchanging of datasets. The SSTable can be indexed by the tuple and dated, which may allow for quickly scanning the SSTable or data record using prefix scans to identify queries of a content campaign or a content group. In some implementations, the SSTable keys can be prefix compressed to save space.

The data records may include additional information that facilitates providing detailed search query report. The data record can include, e.g., a search query responsive to which the content item was selected for display. The content item may have been selected for display responsive to the search query entered by a computing device matching one or more content selection criteria associated with a content providers content campaign, content group or content item. The data record can also include information about the content selection criteria (e.g., keyword) that matched the search query, resulting in a content item associated with the content selection criteria being selected for display alongside search results for the search query. The data record may further include information about the content selection criteria (e.g., keyword) that resulted in a content item with which a computing device interacted (e.g., a click or conversion).

The database 160 can store information that facilitates generating a semantic criteria performance report and updating a content campaign with semantic criteria. For example, the database 160 may be designed and constructed to store the information in one or more data structures in memory, storage, or a hard drive. The database 160 may be stored on the data processing system 120, or may be stored in another location, but be accessible to the data processing system 120 via network 105. In an illustrative example, the value protocol used to define how information is stored in or communicated to the data record may include:

message SearchEntityCounters {
    optional int64 impressions=1;
    optional int64 clicks=2;
    optional int64 position_sum=3;
    optional int64 cost_micros=4;
    optional double cost_usd=5;
    optional double predicted_ctr_sum=6;
    optional int64 conversions=7;
    optional EntityAnnotation result_entities=8;
    optional EntityAnnotation query_entities=9;
    };

The data processing system 120 may include an entity engine 145 designed and constructed to access a database 160 storing a search query report, data records having information associated with search query reports, or the information processed by log processor 140. The search query report can include search queries that correspond to select content items of a content campaign. One or more content items of the content campaign may have been selected for display alongside search results based on the search queries in the search query report. The search query report may include performance metrics associated with the search queries that indicate how content items that were triggered for display based on the search query performed on the web page. For example, the content item may be displayed alongside search results. The search results may be responsive to the search query. The content items may also be based on the search query. In some implementations, the data structure storing the search query report may be in a table format, such as an SSTable. The table may include search queries and performance metrics for the search query. Performance metrics can include, e.g., number of impressions, number of clicks, number of conversions, a click through rate (e.g., ratio between clicks and impressions such as the number of clicks per thousand impressions), conversion rate (e.g., ratio between conversions and impressions), cost per click, cost per conversion, return on investment, position of content item, cost micros (e.g., cost per thousand impressions of content item on a given web page or web site), or predicted click through rate. Thus, each search query in the search query report may have one or more corresponding performance metrics.

The entity engine 145 can identify entities in a search query to annotate the search query reports with entities. For example, a search query "New York hotel" may include two entities as follows: "New York" and "hotel". The entity engine 145 may determine that search query "hotels in NYC" includes the same two entities: "New York" and "hotels". The entity engine 145 may further return entities at various levels of granularity, such as New York city, New York, Northeast America, United States of America, or western hemisphere.

The entity engine 145 may annotate the search query reports in one or more phases or using different annotation techniques or processes. In one technique, the entity engine 145 may annotate the search query report with entities in an offline process, such as during log processing performed by the log processor 140, as shown in the message protocol above. The entity engine 145 may use this technique to annotate queries that are already logged with entities. In another technique, the entity engine 145 may annotate the search query reports with entities in an online process, such as responsive to a request to annotate entities. In this technique, the entity engine 145 can annotate search queries for each content group during a content group-specific processing. The entity engine 145 may access or employ one or more entity annotation algorithms that may use one or more entity repositories accessible via database 160 or network 105.

The data processing system 120 may trigger the entity engine 145 to annotate search queries for a content campaign or a content group responsive to a content provider 125 submitting a content campaign or a content group for inspection via interface 135. The data processing system 120 may add the annotate request to a work flow which may be periodically processed by the entity engine 145.

An entity may be a single person, place or thing, and a repository of entities can include millions of entities that each have a unique identifier to distinguish among multiple entities with similar names (e.g., a Jaguar car versus a jaguar animal). The data processing system can access an entity and scan arbitrary pieces of text (e.g., text in web pages, text of keywords, text of content, text of advertisements) to identify entities from various sources. One such source may be a manually created taxonomy of entities such as an entity graph of people, places, properties, and things, built by a community of users. For example, an entity may be different from a keyword because an entity includes a hierarchical relationship to one or more other entities. Each entity may include metadata based on the relationship between the entity and other entities.

In some implementations, the data processing system 120 obtains a classification of a plurality of entities. An entity may be a single person, place, thing or topic. Each entity has a unique identifier that may distinguish among multiple entities with similar names (e.g., a Jaguar car versus a jaguar animal). A unique identifier ("ID") may be a combination of characters, text, numbers, or symbols. The data processing system 120 may obtain the classification from an internal or third-party database via network 105. In one implementation, the entities may be manually classified by users of a user device 110. In some implementations, users may access the database of entities via network 105. Users may upload at least one entity or upload multiple entities in a bulk upload. Users may classify the uploaded entities, or the upload may include the classification of at least one entity. In some implementations, upon receiving an entity, the data processing system 120 may prompt the user for a classification.

Entities can be manually classified by users. Classifications may indicate the manner in which entities are categorized or structured, e.g., ontology. For example, an ontological classification may include attributes, aspects, properties, features, characteristics, or parameters that entities can have. Ontological classifications may also include classes, sets, collections, concepts, or types. An ontology of "vehicle" may include: type—ground vehicle, ship, air craft; function—to carry persons, to carry freights; attribute—power, size; component—engine, body; etc. In some implementations, the manual classification includes structured data that provides a manually created taxonomy of entities. In some implementations, entities may be associated with an entity type, such as people, places, books, or films. Entity types may include additional properties, such as date of birth for a person or latitude and longitude for a location. Entities may also be associated with domains, such as a collection of types that share a namespace, which includes a directory of uniquely named objects (e.g., domain names on the Internet, paths in a uniform resource locator, or directors in a computer file system). Entities may also include metadata that describes properties (or paths formed through the use of multiple properties) in terms of general relationships.

The data processing system 120 or a user of computing device 110 may classify an entity based on a domain, type, and property. In some implementations, a domain may be American football and have an ID "/american_football". This domain may be associated with a head coach type with ID "/American_football/football_coach". This type may include a property for current team head coached with ID "/American_football/football_coach/current_team_head_coached". Each domain, type, property or other category may include a description. For example, "/American_football/football_coach" may include the following description: "'Football Coach' refers to coaches of the American sport Football." The data processing system 120 can scan text or other data of a document and automatically determine a classification. The data processing system 120 can scan information resources via network 105 for information about football coaches, and classify that information as "/American_football/football_coach". The data processing system 120 can assign the entity football coach a unique identifier that indicates a classification.

Figure 2:
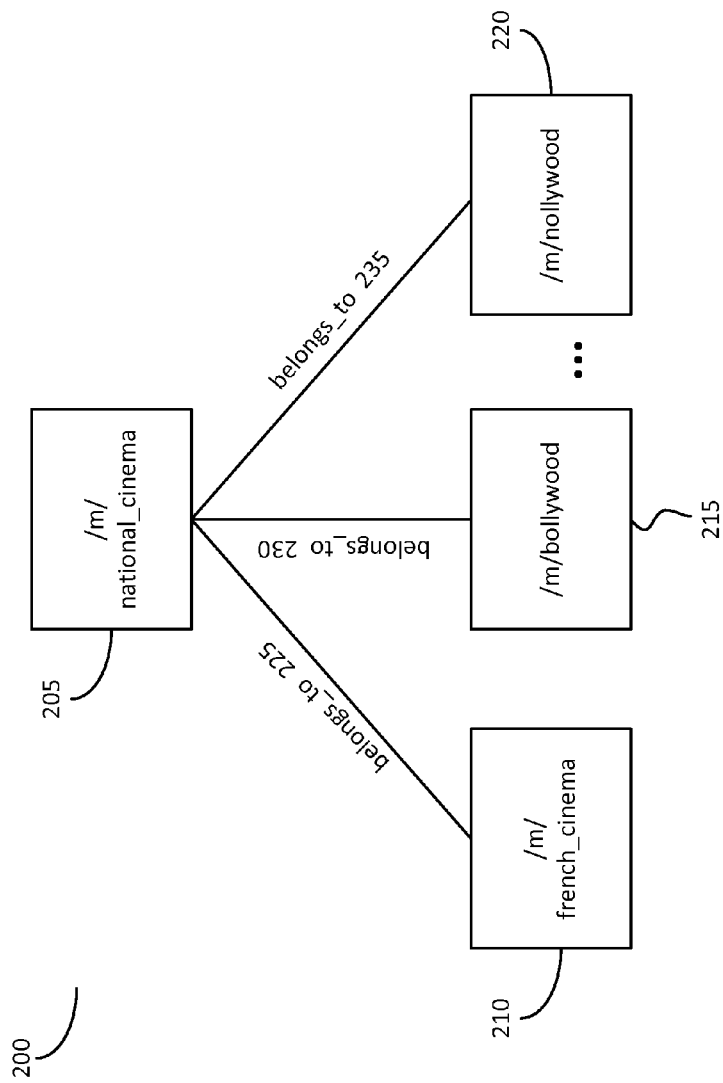
FIG. 2 is an illustration of entity relationships in accordance with an implementation.

Entities may be classified, at least in part, by one or more humans ("entity contributors"). This may be referred to as manual classification. In some implementations, entities may be classified using crowd sourcing processes. The data processing system 120 (or a component thereof or associated with the data processing system 120) can receive crowd sourced information and use the information to generate the taxonomy of entities. For example, the data processing system 120 may receive a data file from one or more humans using a computing device that provides a taxonomy of entities. For example, and as shown in FIG. 2, the taxonomy of entities received from a user of a computing device can indicate a main entity as national_cinema 205. The data file may further indicate that entities French_cinema 210, Bollywood 215, and Nollywood 220 belong to (225, 230, 235) the main entity national_cinema 205. Crowd sourcing may occur online or offline and may refer to a process that involves outsourcing tasks to a defined group of people, distributed group of people, or undefined group of people. Users may add, modify, or delete classifications online. An illustrative implementation of offline crowd sourcing may include assigning the task of uploading or classifying entities to an undefined public not using the network 105, e.g., to students in a classroom or passersby on the street or at a mall.

The data processing system 120 can obtain or gain access to the classification of a plurality entities from repository 160 (e.g., a database) or another database accessible via network 105. In some implementations, entities may be stored in a graph database where the entity data structure includes as a set of nodes and a set of links that establish relationships between the nodes. The entity data structure in the graph database may be non-hierarchical, which may facilitate modeling complex relationships between individual elements, and allow entity contributors to enter new objects and relationships into the underlying graph structure.

In some implementations, the data processing system 120 (e.g., via entity engine 145) identifies an entity of a search query provided by a computing device 110 (e.g., input into a search engine). The entity engine 145 may identify zero, one or many entities in or associated with the search query. The data processing system 120 may identify entities by mapping terms, keywords, or phrases in the search query to one or more entities in a database. The data processing system 120 may score the entities based on the relations among entities in the database and select the entities with the highest weight as page entities. The data processing system 120 may further assign a confidence score to the entity, and select, for further processing, the entity with the highest confidence score. The confidence score may reflect the likelihood that the identified entity in the database semantically matches the search query.

In some implementations, the entity engine 145 may identify multiple interpretations of the search query, where each interpretation includes one or more entities and an individual confidence score within that interpretation. In an illustrative implementation, a search query "flight from springfield to paris" may have multiple interpretations because there are multiple cities or towns named "Springfield". Thus, each interpretation of "Springfield" might have its own unique entity identifier for a specific "Springfield" instance, while the unique entity identifier for "Paris" may remain the same. Upon identifying multiple interpretations of the search query, where for example at least two of the interpretations include at least one entity, the data processing system 120 may filter, select or otherwise identify interpretations or entities to use based on the confidence score of the entity. The data processing system 120 may identify entities of interpretations that exceed a threshold. In some implementations, the data processing system 120 may determine an average confidence score for an interpretation, a weighted average of confidence score, or otherwise determine a confidence score, accuracy or quality for the overall interpretation in order to select an interpretation for content selection.

The identified entities can include additional information about the classification (e.g., metadata). In some implementations, the additional information may include a domain, type, property, or description. In some implementations, the entity includes a unique identifier that indicates a classification of the entity. The additional information may be inferred via the unique identifier of the entity. In an illustrative implementation, an entity may be French, with a unique identifier "/dining/cuisine". The unique identifier "/dining/cuisine" may include properties such as description, region of origin, restaurants, ingredients, dishes, or chefs.

The data processing system 120 may obtain some or all of the additional information associated with the entity and annotate, decorate or otherwise associate that information with the entity. The additional information may be linked to the entity, where the link includes a relationship. In an illustrative implementation, if the entity is a film, the data processing system 120 can annotate the entity with the following properties: produced by, business/product_line/category, written by, genre, featured film locations, production companies, film country, etc. The entity engine 145 can store the annotated search queries in a data record in the database 160 using the SSTable format.

The data processing system 120 can include a cluster engine 150 that clusters the search queries into one or more subsets based on entities of the search queries. The cluster engine 150 may retrieve, e.g., from database 160, queries that have been annotated with entities by the entity engine 145. The cluster engine 150 may use a clustering technique, such as a heuristic clustering technique, to analyze the annotated search queries and generate a first subset of the queries and a second subset of the queries. The cluster engine can generate, based on a clustering technique applied to the entity for each query of the plurality of queries, a first subset of the plurality of queries and a second subset of the plurality of queries.

The cluster engine 150 can include a first clustering technique (e.g., a first heuristic clustering technique) that groups together all queries that map to the same entity. With the first heuristic clustering technique, one or more groups may have overlapping queries. The cluster engine 150 can include a second clustering technique (e.g., second heuristic clustering technique) that groups together queries with the exact same entities. With the second heuristic clustering technique, the groups may contain mutually exclusive queries.

In an illustrative example, a first search query may include "New York hotels" and a second search query may include "New York movie theaters". The entity engine 145 may annotate the first search query with entities "New York" and "hotels"; and annotate the second search query with entities "New York" and "entertainment". The cluster engine 150 may, using the first cluster technique, group the first search query and the second search query into the same group because both search queries include a common entity "New York". However, if cluster engine 150 determines to use the second clustering technique, the cluster engine 150 may group the first search query and the second search query into separate groups because the two search queries do not contain the exact same entities.

The cluster engine 150 can select the cluster technique based on one or more characteristics associated with the content campaign, content group, search query report, entities, or an indication provided by the content provider 125 requesting the report. A characteristic associated with the content campaign or content group may include a topic, vertical, or concept. The vertical may refer to the vertical of the content item, content group, or content campaign. The vertical may refer to the vertical of the webpage on which the content item was displayed.

For example, the cluster engine 150 may select the second cluster technique for a travel vertical, but select the first cluster technique for a media and entertainment vertical. This may be because the media and entertainment vertical includes more diversity of queries. If a vertical includes a greater diversity of queries, it may be beneficial to select the clustering technique that results in overlapping groups of queries because this would result in each group potentially having a greater number of queries, as compared to the second clustering technique which results in mutually exclusive groups of queries. In some implementations, the content provider 125 (e.g., a computing device accessed by a content provider entity such as an advertiser) can select the clustering technique or associate a cluster technique with a content campaign or content group.

The cluster engine 150 can perform both cluster techniques and select one of the cluster techniques based on a threshold. The cluster engine 150 may use the second clustering technique and determine that the number of search queries in a group falls below a threshold (e.g., there are two few queries in one or more groups). Thus, the cluster engine 150 may switch to or use the first clustering technique such that the groups include overlapping queries, thereby increasing the size of the groups.

For each group of search queries generated by the cluster engine 150, the cluster engine 150 can generate, based on the performance metric for each of the plurality of queries, a first performance metric for the first subset and a second performance metric for the second subset. The first performance metric can be different from the second performance metric. The cluster engine 150 may aggregate, combine, or otherwise process performance metrics of the queries to provide the first performance metric for the subset of search queries. The cluster engine 150 can obtain the performance metric for each query from the data record stored in database 160 that includes the search query report information, e.g., stored in the SSTable format. The cluster engine 150 may aggregate, combine, or otherwise process performance met- The data processing system 120 can include a campaign generator 155 that provides, e.g., via interface 135, a semantic traffic report that includes the groups, labels, and aggregated performance metrics for display to a content provider 115. The campaign generator 155 can generate a user interface to display the group with a label and corresponding aggregated performance metric. The user interface may further indicate that the group, label, and corresponding aggregated performance metric is determined for a certain content campaign or content group of the content provider.

The campaign generator 155 may be configured to generate semantic traffic reports for display. The campaign generator 155 can generate the semantic traffic report using information retrieved from database 160, the cluster engine 150, entity engine 145, log processor 140 or interface 135. The semantic traffic report generated by the campaign generator 155 may identify entities, search queries, performance metrics, or aggregated performance metrics or other statistics. An illustrative implementation of a semantic traffic report generated by the campaign generator 155 is shown in Table 1:

TABLE 1

Illustration of a Semantic Traffic Report in accordance with an implementation

| Entities | Search Queries | Performance Metrics |
|---|---|---|
| /m/textbook<br>/m/used_book<br>/m/book | Sell books online;<br>Textbook buyback;<br>Sell your books online;<br>Buyback books;<br>. . . | Impressions, clicks,<br>conversions, cost, position,<br>click through rate, conversion<br>rate . . . |
| /m/textbook<br>/m/selling<br>/m/used book<br>/m/book<br>/m/<online_retailer>_com | Sell textbooks to <online_retailer>;<br>Sell textbooks to <online_retailer><br>for cash;<br>Sell books to <online_retailer>;<br><online_retailer> book buyback;<br><online_retailer> buy back books;<br>Sell your books on<br><online_retailer>;<br>Sells books <online_retailer> | Impressions, clicks,<br>conversions, cost, position,<br>click through rate, conversion<br>rate . . . |
| . . . | . . . | . . . | rics (e.g., based on network activity information or traffic statistics) by determining a total performance metric for the subset of queries or the group. A total performance metric for a group may refer to combining the performance metrics for the group. For example, a total number of impressions for the group can be determined by adding together the number of impressions for each search query in the group. In another example, a total click through rate for a group may be determined by adding together the total number of clicks for all queries in the group divided by the total number of impressions for all queries in the group.

The cluster engine 150 may aggregate performance metrics using other techniques. For example, the cluster engine 150 can aggregate performance metrics by determining an average performance metric or a weighted average. An average number of impressions for the group may be determined by dividing the total number of impressions across all queries in the group by the number of queries in the group. The averages for the groups may be weighted based on the number of queries, for example.

In some implementations, the cluster engine 150 can generate or identify labels for the groups. The labels may be based on the entities of the group. For example, a label for the group including entity "New York" may be "New York". The label for the group including entities "New York" and "hotel" may be "Hotels in New York".

As shown in table 1, the semantic traffic report can include multiple columns and multiple rows. Each row corresponds to a group or set of entities. In this example, the first column includes sets of entities, the second column includes groups of search queries that map to the set of entities, and the third column includes performance metrics or statistics for the group of queries.

The cluster engine 150 may generate a set of entities and identify one or more queries that map to the set of entities based on a clustering technique. The entities corresponding to a group of search queries may be referred to as the set of entities. For example, if the search query "sell books online" maps to entities "/m/textbook", '/m/used book", /m/book", then the data processing 120 can use that tuple as the key for this search query. The data processing system 120 can show queries that map to the same entities together, as shown in the second column of table 1.

The search queries are shown in the second column and are grouped based on the cluster technique by the clustering engine 150. As shown in table 1, the data processing system 120 can show queries that map to the same entities, e.g., the same tuple, together. This may result in one or more of the entities of a set of entities appearing in multiple rows. For example, the entity "/m/textbook" may appear in multiple rows.

The third column shows the performance metrics corresponding to the grouped search queries. The performance metrics may be aggregated performance metrics. The performance metrics may be individual performance metrics for a search query in the group. The performance metrics may include statistical information for the group of queries, such as an average performance metric, standard deviation, min, max, variance, weighted average, or other statistic.

The data processing system 120 may generate another view of the semantic traffic report that creates overlapping clusters of queries that are characterized by a single entity. In this view, a query may be a part of a cluster's set of entities if the query contains the entity. This view may highlight entities that are more discriminant in the dataset and have a higher impact on content selection.

The campaign generator 155 may display a label for one or more groups in the semantic traffic report. The label may be based on the entities. The semantic traffic report may include user interface elements to allow a content provider 125 to make a selection of one or more groups or one or more entities of one or more groups.

The data processing system 120 may receive, via interface 135, a selection of a group or label in the semantic traffic report. A content provider 125 may select, via the user interface (e.g., a button, drop down menu, input text box, finger gesture, or mouse over) the group or label in the semantic traffic report based on the aggregated performance metric. Each group may be associated with a semantic criterion, which may correspond to the label. For example, the label may be based on the entities used to form the group based on the selected clustering technique. The semantic criterion may be the one or more entities that are common to all the queries in the group. In some implementations, the content provider may select as the semantic criterion some or all of the entities that are common to all the queries in the group. The content provider 125 may further indicate, via the user interface, to add the semantic criterion to a content campaign or content group of the content provider. The campaign generator 155, responsive to the indication received from the content provider 125, can update the content campaign or content group to include the selected semantic criterion.

The content provider 125 may add the semantic criterion as a positive semantic criterion or a negative semantic criterion. A positive semantic criterion may be used to select content items of the content campaign or content group for display responsive to a search query input by a computing device matching the positive semantic criterion. A negative semantic criterion may prevent the content items of the content campaign or content group from being displayed responsive to a search query input by a computing device matching the negative semantic criterion.

The content provider 125 may select to add a semantic criterion as a positive semantic criterion if the aggregated performance metrics for the group in the semantic traffic report is favorable. For example, if the performance metric for the group indicates a high click through rate or high conversion rate, the content provider may want to add the semantic criterion corresponding to that group to a content campaign. On the other hand, if the group of search query has an aggregated performance metric that is low, such as a low conversion rate, then the content provider 125 may decide to add the semantic criterion associated with the group as a negative semantic criterion.

The determination as to adding a semantic criterion as a positive or negative semantic criterion can be based on one or more aggregated performance metrics for one or more groups. The data processing system 120 may display, in the semantic traffic report, a ranking of the groups based on one or more aggregated performance metrics. The content provider 125 may select a semantic criterion associated with the highest ranking group. In some implementations, a combination of aggregated performance metrics may be analyzed to make a determination. The data processing system 120 may rank the groups based on a combination aggregated performance metric. For example, the combination performance metric may be based on number of impressions and clicks; number of conversions, number of impressions, and cost per conversion; position and cost; or any other combination of two or more performance metrics that may facilitate determining a performance of a group and selecting one or more semantic criteria for inclusion in a content campaign or content group.

The data processing system 120, e.g., via the campaign generator 155, may include rules that use the semantic criterion. A rule may include a conditional rule that facilitates content selection. The rule may include an "if, then" statement. The rule may increase or decrease parameters used for content selection responsive to a condition being met. The condition may include the presence or absence of a semantic criterion in a search query. The data processing system 120 may compare the semantic criterion with the search query to identify a match. The data processing system 120 can compare the semantic criterion with entities of the search query to determine the match. For example, a semantic criterion "hotel" may match with a search query containing terms "hotels", "hostel", "temporary housing", or "resort" as these search query terms may correspond to entity "hotel".

In an illustrative implementation, the data processing system 120 receives a search query input by a computing device 110. The data processing system 120 compares the search query with a first semantic criterion associated with a candidate content campaign or content group. Responsive to determining that the search query matches the first semantic criterion, the data processing system 120 may identify a first rule associated with the first semantic criterion and the content campaign. The first rule may be stored in database 160. The first rule may indicate to increase a base bid of the content campaign (or content group or content item) by an amount (e.g., a percentage or an absolute amount). Thus, the data processing system 120 may, in accordance with the first rule, increase the bid amount associated with the candidate content item responsive to the search query matching the semantic criterion. Increasing the bid amount may increase the likelihood of the content item being selected for display on a web page, such as a web page displaying search results for the search query input by the computing device 110, where the search query matches the semantic criterion.

The data processing system 120 can also identify a second rule associated with the content campaign of the content provider 125. The second rule may be stored in database 160 and be associated with the content campaign, e.g., via a content campaign identifier. The second rule may indicate to decrease a bid amount by a bid percentage when selecting content items of the contain campaign in response to a search query from a computing device 110 that includes a second semantic criterion. For example, a the content campaign may be directed to a luxury hotel chain. The semantic traffic report generated by the data processing system may indicate low aggregated performance metrics for search queries in a group corresponding to an entity or label "cheap hotels". Thus, a content provider 125 or the data processing system 120 may add, responsive to the low aggregated performance metrics, a negative semantic criterion of "cheap hotels" to the content campaign. The content provider 125 may further add a rule that states to decrease the bid amount responsive to a search query matching semantic criterion "cheap hotels". The rule may decrease the bid amount by a percentage (e.g., 20%) or decrease the bid amount to zero or otherwise adjust the bid amount or other selection parameter such that the likelihood of the content item being selected for display is reduced or the content item is prevented from being selected for display entirely.

The campaign generator 155 may show or generate additional types of semantic traffic reports or provide different views. The campaign generator 155 may provide a report that shows queries where an entity appears as compared to queries where the entity does not appear. The campaign generator 155 can drill down by entity, or by a set of entities. In an illustrative implementation, a content provider 125 can provide a set of entities such as "m/french_cinema", /m/Bollywood", "/m/nollywood". The campaign generator 155, upon receiving this set of entities, can generate the following semantic traffic report shown in table 2.

TABLE 2

Illustration of a break-down semantic traffic report in accordance with an implementation.

| Main Entity | Other entities appearing in addition to main entity | Performance metrics |
| --- | --- | --- |
| /m/French_cinema | /m/film | Stats of (/m/French_cinema, /m/film) |
|  | /m/paulette | Stats of (/m/French_cinema, /m/film) |
|  | Other (possibly omitting some long-tail queries within /m/French_cinema) sum | Stats for all of /m/French_cinema |
| /m/bollywood | /m/film | Stats of /m/bollywood, /m/film |
|  | /m/son_of_sardaar | Stats of /m/Bollywood, /m/film |
|  | Other (possibly omitting some long-tail queries within /m/French_cinema) sum | Stats for all of /m/bollywood |
| /m/nollywood | . . . |  |
| /m/Nollywood, /m/bollywood | . . . | Stats for both entities |
| [none] |  | [when none of the entities in the breakdown set are in the query] |

To enumerate the national genres as shown in the first column of table 2, the data processing system 120 can utilize a topological entity graph including entity relationships. FIG. 2 is an illustration of entity relationships in accordance with an implementation. Using a graph or structure of entity relationships 200, the data processing system 120 can enumerate or identify the national genres by finding the appropriate relationship in the graph 200.

As shown in FIG. 2, the main entity is /m/national_cinema 205. The genres corresponding to this main entity 205 include /m/French_cinema 210, /m/Bollywood 215 and /m/Nollywood 220. Each of these entities can include an entity identifier, that may include a unique identifier, hierarchical identify, characters, symbols, or numbers. Each of these entities 210, 215, 220 can include or be defined based on their relationship to the main entity 205, as illustrated by the belongs_to links 225, 230, and 235.

Further, the data processing system 120 can use an entity graph such as graph 200 to define vertical specific templates to, e.g., classify queries in the travel verticals into one of predefined templates (e.g., /m/travel_product, /m/geo_feature).

In some implementations, the data processing system 120 may allow for benchmarking of a first content campaign of a first content provider 125 as compared to a second content campaign. The second content campaign may be of the first content provider 125, or of a second content provider 125. The benchmarking may be done anonymously, e.g., by not identifying the second content provider 125. The benchmarking may compare content campaigns that are similar in some way, e.g., same verticals, same main entity, etc.

Figure 3:
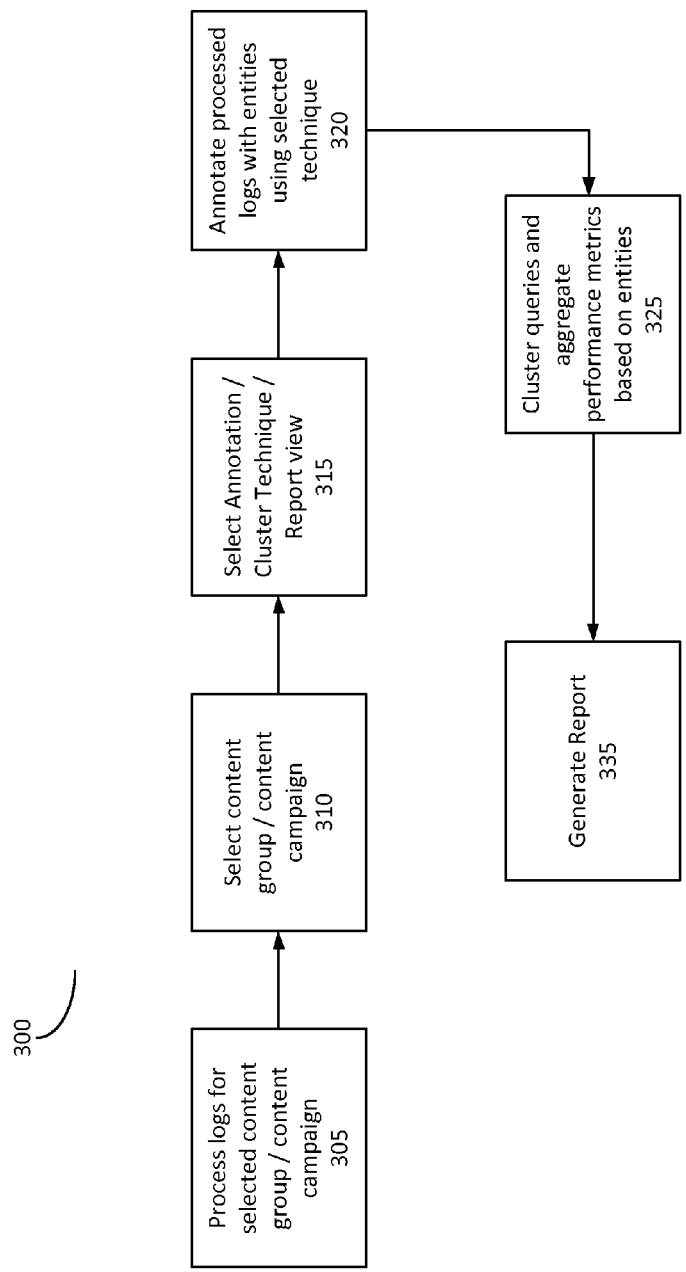
FIG. 3 is an illustration of a flow chart for optimizing content selection infrastructure in accordance with an implementation.

FIG. 3 is an illustration of a method or workflow 300 for optimizing content selection infrastructure in accordance with an implementation. The workflow 300 may be performed or executed by one or more component of system 100 shown in FIG. 1, including, e.g., the data processing system 120, interface 135, log processor 140, entity engine 145, cluster engine 150 and campaign generator 155.

At act 305, the data processing system 120 can process logs for a selected content campaign or content group. Processing the logs may include a backend process that is performed based on or responsive to a time interval, such as hourly, daily, or some other time interval. The processing logs may include processing queries, log events, identify spam-free queries, clicks, click cost, average position, and conversions. Processing logs may further include categorizing or breaking down the traffic by tuple (e.g., campaign, content group, query language, query_country, normalized query). The results of this may be stored in a dated SSTable indexed by the tuple to facilitate quickly scanning the SSTAble by using prefix scans to identify queries of either a campaign or content group.

At act 310, the data processing system 120 receives processed logs files of the content group (e.g., advertisement group) or content campaign (e.g., advertisement campaign) for further processing. A content provider 125 may submit the log files for the content group or content campaign via a front end interface. The data processing system 120 may provide a web interface and a command line tool to submit the content campaign or content group logs. The content group or content campaign may include historical performance information, such as logs or impression records.

At act 315, the data processing system 120, responsive to a request for analysis of a dataset (e.g., content group, content campaign, or log files of network traffic), can identify one or more annotation techniques used to annotate queries. The data processing system 120 can also provide different options for clustering algorithms. The data processing system 120 can also provide different options for different types of different views of semantic traffic reports. The data processing system 120 may use or select a predetermined annotation technique, clustering technique or type of semantic traffic report, or display options for each and allow a user of the system to select an option (e.g., receive a selection via interface 135 from a content provider 125 of one or more of an annotation technique, clustering technique, or type or view of a semantic traffic report). Choices for annotation technique may include an offline annotation technique that identifies entities stored in the logs, or an online annotation technique that includes accessing a repository to identify a matching entity. Choices for clustering techniques may include a clustering based on the same tuple, or clustering based on single entity being common. Choices for semantic traffic reports may include a default report shown in Table 1, an overlapping cluster view, or a breakdown view shown in Table 2.

At act 320, the data processing system 120 can annotate the processed logs using the selected annotation technique. At act 325, the data processing system 120 can cluster the queries by mapping them to an entity or a set of entities. The data processing system 120 can further aggregate performance metrics for each cluster. At act 335, the data processing system can generate a report based on the selected view.

The data processing system can generate a performance forecast for the content campaign based on the semantic criterion and historical search query reports. A performance forecast may indicate a predicted or estimated performance of the updated content campaign with the semantic criterion. For example, the data processing system 120 can receive a selection of a content campaign (e.g., a different content campaign or the same content campaign that is being updated). The data processing system 120 can access historical logs for the content campaign. The data processing system 120 can access performance metrics along with the historical logs. The data processing system 120 can identify queries in the historical logs and determine which of those queries would have matching the updated content campaign including the new semantic criterion. Thus, the data processing system 120 can determine if the performance of the content campaign with the new semantic criterion would be the same, different, improved, or worse. The data processing system 120 can generate a semantic traffic report based on this determination.

Figure 4:
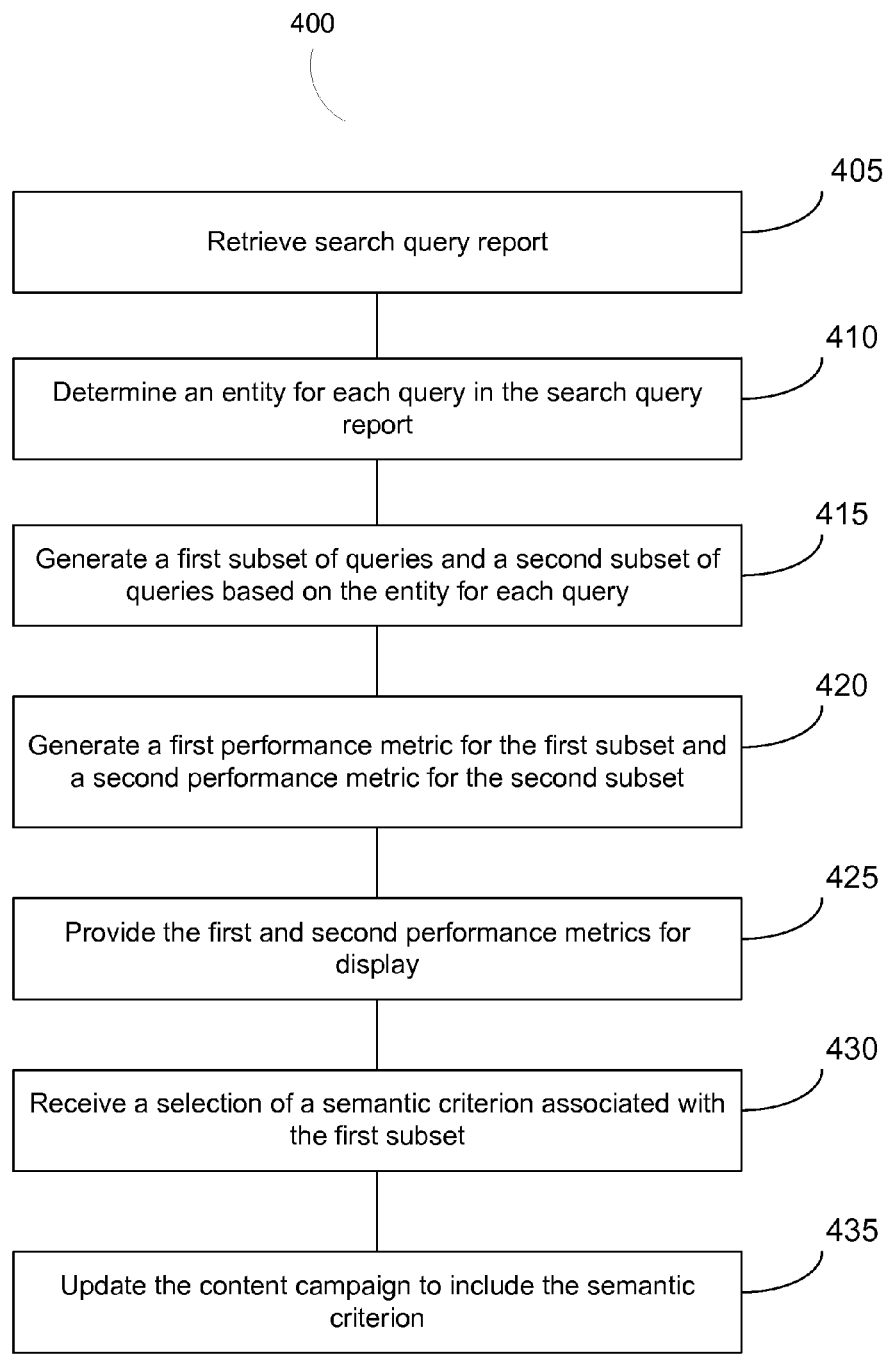
FIG. 4 is an illustration of a method of optimizing content selection infrastructure in accordance with an implementation.

FIG. 4 is an illustration of a method of optimizing content selection infrastructure in accordance with an implementation. The method 400 may be performed by system 100 or data processing system 120, or one or more components thereof, illustrated in FIG. 1. The data processing system 120 at act 405 can retrieve or receive a search query report for a content campaign or content group. At act 410, the data processing system 120 can determine an entity for each query in the search query report. At act 415, the data processing system 120 can generate a first subset of queries and a second subset of queries based on the entity for each query. At act 420, the data processing system 120 can generate a first performance metric for the first subset and a second performance metric for the second subset. At act 425, the data processing system 120 can provide the first and second performance metrics for display. At act 430, the data processing system 120 can receive an selection of a semantic criterion associated with the first subset. At act 435, the data processing system can update the content campaign to include the semantic criterion.

At act 405, the data processing system 120 (e.g., via interface 135) can retrieve or receive a search query report for a content campaign or content group. The data processing system 120 can receive a search query report from a content provider 125. The data processing system 120 may receive an indication of a content campaign or content group, and access the search query report from the database 160. The data processing system 120 may receive search query reports for a certain date range. The search query report may be date stamped or time stamped. The search query reports may include performance metrics for each search query. The data processing system 120 may receive the search query reports in a batch process. The data processing system 120 may receive the search query report in a data file, text file, comma delimited file, tab delimited file, or data structure. The queries in the search query report can correspond or be associated with the content campaign. For example, content item in the content campaign was selected because they matched one or more of the queries in the search query report.

At act 410, the data processing system 120 (e.g., an entity engine 145) can determine an entity for each query in the search query report. The data processing system 120 may identify entities stored in the search query report, or parse the queries in the search query and access an entity repository to determine one or more entities for each search query in the search query report. The data processing system 120 may identify one entity for a search query, or multiple entities for a search query. The data processing system 120 may use any technique for identifying entities of a search query. The data processing system 120 may annotate, append, or otherwise associate an identified entity with the corresponding search query. The data processing system 120 may generate a new data file or data structure that includes the entity for the search query.

At act 415, the data processing system 120 (e.g., via a cluster engine 150) can generate a first subset of queries and a second subset of queries based on the entity for each query. The data processing system 120 can cluster search queries together that map to a same entity or all the same entities (e.g., to the same tuple of entities), as shown in Table 1. A first subset of queries (or first group of queries) may refer to a first row including a first set of entities in the Table 1, and the second subset of queries (or second group of queries) may refer to a second row including a second set of entities in the Table 1.

At act 420, the data processing system 120 (e.g., via cluster engine 150) can generate a first performance metric for the first subset and generate a second performance metric for the second subset. The data processing system 120 may aggregate performance metrics to generate the first performance metric and the second performance metric. The data processing system 120 can identify performance metrics for each search query of a subset of search queries and aggregate, combine, or otherwise process them. Generating the first and second performance metric may include summing the performance metric, generating a statistic of the performance metric, taking an average, determining a statistic among the performance metric, or otherwise combining the performance metric. The type of generations or aggregation may vary based on the performance metric. For example, a number of clicks metric may be summed, whereas a cost per click metric may be averaged. Statistics or aggregated performance metric may include a range, such as a minimum and maximum performance metric, mean, mode, or weighted average.

At act 425, the data processing system 120 (e.g., via cluster engine 150 or campaign generator 155) can provide the first and second performance metrics for display. The first performance metric may be for the first row, as shown in column three of table 1. The second performance metric may be for the second row, as shown in column three of table 1. The data processing system 120 may show multiple performance metrics, or may generate additional performance metrics by combining different performance metrics (e.g., number of impressions and number of clicks can be combined to generate a click through rate).

At act 430, the data processing system 120 (e.g., via interface 135) can receive an indication to add a semantic criterion. The indication can include a selection of a semantic criterion. A content provider 125 may select a semantic criterion of the first subset. The content provider 125 may select the semantic criterion of the first subset as a positive semantic criterion, in which case the first performance metric may be better than the second performance metric. The content provider 125 may select the semantic criterion of the first subset to add as a negative semantic criterion, in which case the first performance metric may be worse than the second performance metric. Better or worse may be determined by comparing performance metrics and may vary based on the type of performance metric. For example, a better cost performance metric may be a lower cost, whereas a better conversion rate performance metric may be a higher conversion rate. The content provider 125 may further indicate to add the semantic criterion as a negative or positive criterion.

The semantic criterion may include the set of entities in the first column shown in Table 1. The semantic criterion may include one or more entities of the set of entities. The semantic criterion may include a main entity to which the one or more entities of the set of entities belongs (e.g., as shown in graph 200 shown in FIG. 2).

At act 435, the data processing system 120 (e.g., via campaign generator) can update the content campaign to include the semantic criterion. Updating the content campaign may include an update to a content group of the content campaign. Updating the content campaign may include adding the selected semantic criterion to the content campaign and using it for content selection. Adding or selecting the semantic criterion may include adding a rule defining how content selection with respect to the semantic criterion is to be performed (e.g., increase/decrease bid amount based on semantic criterion matching received search query or based on semantic criterion being absent from search query, or preventing content item from being displayed based on semantic criterion matching or not matching received search query).

Figure 5:
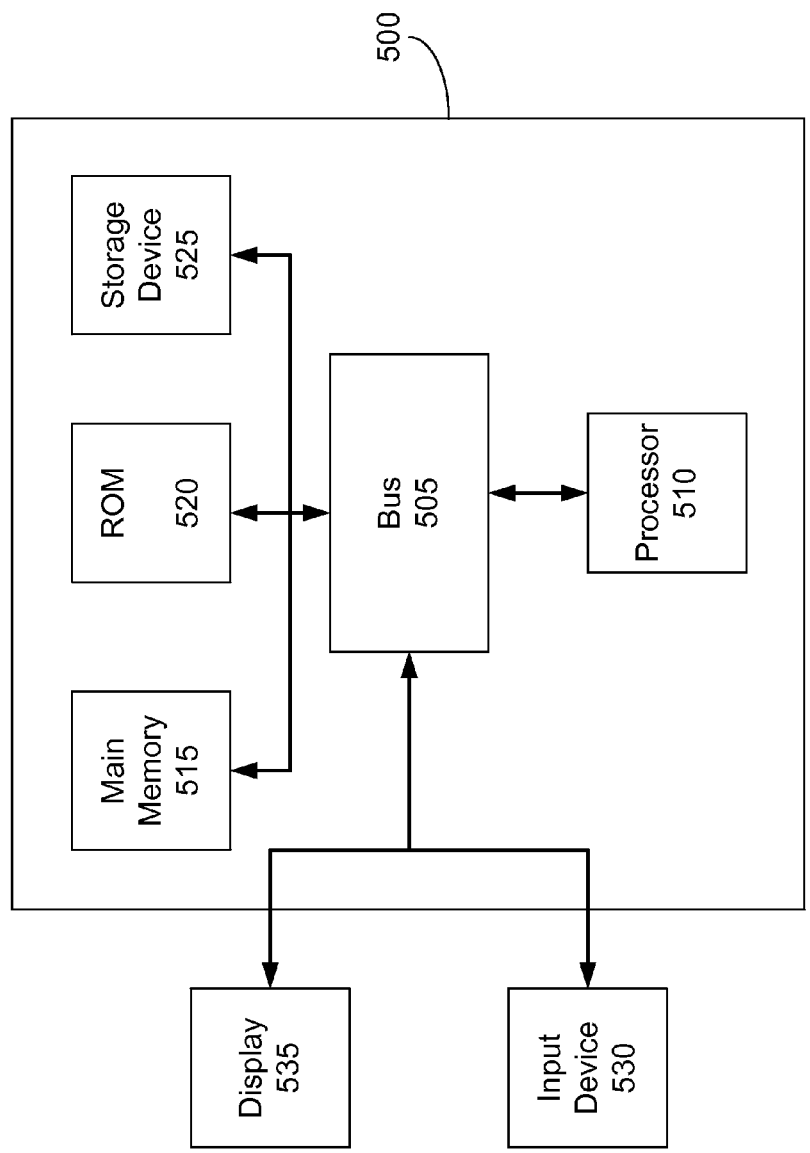
FIG. 5 is a block diagram illustrating a general architecture for a computer system that may be employed to implement various elements of the system shown in FIG. 1 and the methods shown in FIGS. 3 and 4, among others, in accordance with an implementation.

FIG. 5 is a block diagram of a computer system 500 in accordance with an illustrative implementation. The computer system or computing device 500 can be used to implement the system 100, content provider 125, computing device 110, content publisher 115, data processing system 120, interface 135, log processor 140, entity engine 145, cluster engine 150, campaign generator 150, and database 155. The computing system 500 includes a bus 505 or other communication component for communicating information and a processor 510 or processing circuit coupled to the bus 505 for processing information. The computing system 500 can also include one or more processors 510 or processing circuits coupled to the bus for processing information. The computing system 500 also includes main memory 515, such as a random access memory (RAM) or other dynamic storage device, coupled to the bus 505 for storing information, and instructions to be executed by the processor 510. Main memory 515 can also be used for storing position information, temporary variables, or other intermediate information during execution of instructions by the processor 510. The computing system 500 may further include a read only memory (ROM) 520 or other static storage device coupled to the bus 505 for storing static information and instructions for the processor 510. A storage device 525, such as a solid state device, magnetic disk or optical disk, is coupled to the bus 505 for persistently storing information and instructions.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information and command selections to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535.

The processes, systems and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. In alternative implementations, hard-wired circuitry may be used in place of or in combination with software instructions to effect illustrative implementations. Thus, implementations are not limited to any specific combination of hardware circuitry and software.

Although an example computing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of optimizing content selection infrastructure, comprising:

retrieving, by an entity engine executing on one or more processors of a data processing system, a search query report that includes 1) a plurality of queries corresponding to selected content items of a content campaign, and 2) a performance metric for each of the plurality of queries determined based on a performance of the selected content items of the content campaign;

determining, by the entity engine using a database, an entity for each query of the plurality of queries, the entity having a unique identifier indicating a classification based on a domain, a type and a property that establishes a relationship to at least one other entity stored in the database;

generating, by a cluster engine executing on the data processing system, using a clustering technique applied to the unique identifier indicating the classification of the entity for each query of the plurality of queries, a first subset of the plurality of queries and a second subset of the plurality of queries, wherein the plurality of queries are separated into the first subset and the second subset based on the classification indicated by the unique identifier of the entity for each query of the plurality of queries;
generating, by the cluster engine based on the performance metric for each of the plurality of queries, a first performance metric for the first subset and a second performance metric for the second subset, the first performance metric different from the second performance metric;
providing, for display via an interface, the first performance metric and the second performance metric;
receiving, by the data processing system, based on the first performance metric, a selection of a semantic criterion associated with the first subset generated based on the classification indicated by the unique identifier of the entity for each query of the plurality of queries; and
updating, by the data processing system, the content campaign to include the semantic criterion.

2. The method of claim 1, comprising:
selecting the semantic criterion from the entity of the first subset.

3. The method of claim 1, wherein at least one of the selected content items was displayed via a computing device that input a query of the plurality of queries.

4. The method of claim 1, wherein queries of the first subset are mutually exclusive from queries of the second subset.

5. The method of claim 1, wherein queries of the first subset overlap with queries from of the second subset.

6. The method of claim 1, comprising:
identifying a first entity and a second entity of a first query of the plurality of queries;
generating the first subset to include each query of the plurality of queries having the first entity; and
generating the second subset to include each query of the plurality of queries having the first and the second entity.

7. The method of claim 1, comprising:
identifying a characteristic of the plurality of queries; and
selecting the clustering technique from a plurality of clustering techniques based on the characteristic.

8. The method of claim 1, comprising:
selecting, for display on a device responsive to a search query input via an interface of the device, a content item of the content campaign based on the semantic criterion, the first performance metric greater than the second performance metric.

9. The method of claim 1, comprising:
preventing, from display on a device responsive to a search query input via an interface of the device, a content item of the content campaign based on the semantic criterion, the first performance metric less than the second performance metric.

10. The method of claim 1, wherein the performance metric includes at least one of click through rate, conversion rate, cost per click, cost per conversion, or return on investment.

11. The method of claim 1, comprising:
generating, by the data processing system, a performance forecast for the content campaign based on the semantic criterion and historical search query reports.

12. A system for optimization of content selection infrastructure, comprising:
an entity engine executing on one or more processors of a data processing system that retrieves a search query report that includes 1) a plurality of queries corresponding to selected content items of a content campaign, and 2) a performance metric for each of the plurality of queries determined based on a performance of the selected content items of the content campaign;
the entity engine determines, from a database, an entity for each query of the plurality of queries, the entity having a unique identifier indicating a classification based on a domain, a type and a property that establishes a relationship to at least one other entity stored in the database;
a cluster engine executing on the data processing system that generates, based on a clustering technique applied to the unique identifier indicating the classification of the entity for each query of the plurality of queries, a first subset of the plurality of queries and a second subset of the plurality of queries, wherein the plurality of queries are separated into the first subset and the second subset based on the classification indicated by the unique identifier of the entity for each query of the plurality of queries;
the cluster engine generates, based on the performance metric for each of the plurality of queries, a first performance metric for the first subset and a second performance metric for the second subset, the first performance metric different from the second performance metric;
an interface of the data processing system that provides, for display on a display device, the first performance metric and the second performance metric;
a campaign generator executing on the data processing system that receives, based on the first performance metric, a selection of a semantic criterion associated with the first subset generated based on the classification indicated by the unique identifier of the entity for each query of the plurality of queries; and
the campaign generator updates the content campaign to include the semantic criterion.

13. The system of claim 12, wherein the semantic criterion is selected from the entity of the first subset.

14. The system of claim 12, wherein at least one of the selected content items was displayed via a computing device that input a query of the plurality of queries.

15. The system of claim 12, wherein queries of the first subset are mutually exclusive from queries of the second subset.

16. The system of claim 12, wherein the first subset at least partially overlaps with the second subset.

17. The system of claim 12, wherein the data processing system is further configured to:
identify a first entity and a second entity of a first query of the plurality of queries;
generate the first subset to include each query of the plurality of queries having the first entity; and
generate the second subset to include each query of the plurality of queries having the first and the second entity.

18. The system of claim 12, wherein the data processing system is further configured to:
identify a characteristic of the plurality of queries; and
select the clustering technique from a plurality of clustering techniques based on the characteristic.

19. The system of claim 12, wherein the data processing system is further configured to:
select, for display on a device responsive to a search query input via an interface of the device, a content item of the content campaign based on the semantic criterion, the first performance metric greater than the second performance metric.

20. The system of claim 12, wherein the data processing system is further configured to:

prevent, from display on a device responsive to a search query input via an interface of the device, a content item of the content campaign based on the semantic criterion, the first performance metric less than the second performance metric.

\* \* \* \* \*